US010421475B2

(12) United States Patent
Derocher et al.

(10) Patent No.: US 10,421,475 B2
(45) Date of Patent: Sep. 24, 2019

(54) ELECTRIC ACTUATOR MECHANISM FOR RETRACTABLE STEERING COLUMN ASSEMBLY WITH MANUAL OVERRIDE (71) Applicant: STEERING SOLUTIONS IP HOLDING CORPORATION, Saginaw, MI (US)

(72) Inventors: Robert C. Derocher, Essexville, MI (US); Michael J. Srda, Clio, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 380 days.

(21) Appl. No.: 15/351,791

(22) Filed: Nov. 15, 2016

(65) Prior Publication Data
US 2018/0134308 A1 May 17, 2018

(51) Int. Cl.
*B62D 1/181* (2006.01)
*B62D 1/185* (2006.01)
(Continued)

(52) U.S. Cl.
CPC .............. *B62D 1/181* (2013.01); *B62D 1/183* (2013.01); *B62D 1/185* (2013.01);
(Continued)

(58) Field of Classification Search
CPC ........ B62D 1/181; B62D 1/183; B62D 1/185; F16H 2025/2084; F16H 25/2003;
(Continued)

(56) References Cited

U.S. PATENT DOCUMENTS 2,331,996 A 10/1943 Maurer
4,138,167 A 2/1979 Ernst et al.
(Continued)

FOREIGN PATENT DOCUMENTS

CN 1722030 A 1/2006
CN 1736786 A 2/2006
(Continued)

OTHER PUBLICATIONS

China Patent Application No. 201510204221.5 Second Office Action dated Mar. 10, 2017, 8 pages.
(Continued)

*Primary Examiner* — Laura Freedman (57) ABSTRACT

An electric actuator mechanism for a retractable steering column assembly includes an electric motor. The mechanism also includes a drive gear driven by the electric motor. The mechanism further includes a driven gear driven by the drive gear, the driven gear and the drive gear moveable relative to each other between an engaged condition and a disengaged condition, the driven gear operatively coupled to a translating assembly for translating a retractable portion of the retractable steering column assembly between an extended position and a retracted position, the retractable portion disposed in the extended position in a standard driving mode and in the retracted position in an autonomous driving mode, the driven gear and the drive gear moved to the disengaged condition upon a force exerted on the retractable portion by a driver in a direction toward the extended position.

15 Claims, 9 Drawing Sheets

(51) Int. Cl.
*F16H 25/20* (2006.01)
*B62D 1/183* (2006.01)
*F16H 25/22* (2006.01)
*F16H 57/12* (2006.01)

(52) U.S. Cl.
CPC ....... *F16H 25/2003* (2013.01); *F16H 25/205* (2013.01); *F16H 25/2204* (2013.01); *F16H 2025/209* (2013.01); *F16H 2025/2065* (2013.01); *F16H 2025/2084* (2013.01); *F16H 2057/127* (2013.01)

(58) Field of Classification Search
CPC .... F16H 25/205; F16H 25/24; F16H 25/2204; F16H 2057/127; F16H 2025/2065; F16H 2025/209; G05D 2201/0212; B60L 2260/32
See application file for complete search history.

(56) References Cited

U.S. PATENT DOCUMENTS

| | | |
|---|---|---|
| 4,315,117 A | 2/1982 | Kokubo et al. |
| 4,337,967 A | 7/1982 | Yoshida et al. |
| 4,402,236 A | 9/1983 | Nishikawa |
| 4,503,300 A | 3/1985 | Lane, Jr. |
| 4,503,504 A | 3/1985 | Suzumura et al. |
| 4,561,323 A | 12/1985 | Stromberg |
| 4,691,587 A | 9/1987 | Farrand et al. |
| 4,836,566 A | 6/1989 | Birsching |
| 4,921,066 A | 5/1990 | Conley |
| 4,962,570 A | 10/1990 | Hosaka et al. |
| 4,962,944 A | 10/1990 | Reiche et al. |
| 4,967,618 A | 11/1990 | Matsumoto et al. |
| 4,976,239 A | 12/1990 | Hosaka |
| 5,186,573 A | 2/1993 | Flotow |
| 5,240,284 A | 8/1993 | Takada et al. |
| 5,295,712 A | 3/1994 | Omura |
| 5,319,803 A | 6/1994 | Allen |
| 5,488,555 A | 1/1996 | Asgari |
| 5,618,058 A | 4/1997 | Byon |
| 5,668,721 A | 9/1997 | Chandy |
| 5,690,362 A | 11/1997 | Peitsmeier et al. |
| 5,765,116 A | 6/1998 | Wilson-Jones et al. |
| 5,820,163 A | 10/1998 | Thacker et al. |
| 5,893,580 A | 4/1999 | Hoagland et al. |
| 5,911,789 A | 6/1999 | Keipert et al. |
| 6,070,686 A | 6/2000 | Pollmann |
| 6,170,862 B1 | 1/2001 | Hoagland et al. |
| 6,227,571 B1 | 5/2001 | Sheng et al. |
| 6,277,571 B1 | 5/2001 | Sheng et al. |
| 6,301,534 B1 | 10/2001 | McDermott, Jr. |
| 6,354,622 B1 | 3/2002 | Ulbrich et al. |
| 6,360,149 B1 | 3/2002 | Kwon et al. |
| 6,373,472 B1 | 4/2002 | Palalau et al. |
| 6,381,526 B1 | 4/2002 | Higashi et al. |
| 6,390,505 B1 | 5/2002 | Wilson |
| 6,578,449 B1 | 6/2003 | Anspaugh et al. |
| 6,612,393 B2 | 9/2003 | Bohner et al. |
| 6,819,990 B2 | 11/2004 | Ichinose |
| 7,021,416 B2 | 4/2006 | Kapaan et al. |
| 7,048,305 B2 | 5/2006 | Muller |
| 7,062,365 B1 | 6/2006 | Fei |
| 7,295,904 B2 | 11/2007 | Kanevsky et al. |
| 7,308,964 B2 | 12/2007 | Hara et al. |
| 7,428,944 B2 | 9/2008 | Gerum |
| 7,461,863 B2 | 12/2008 | Muller |
| 7,495,584 B1 | 2/2009 | Sorensen |
| 7,628,244 B2 | 12/2009 | Chino et al. |
| 7,719,431 B2 | 5/2010 | Bolourchi |
| 7,735,405 B2 | 6/2010 | Parks |
| 7,793,980 B2 | 9/2010 | Fong |
| 7,862,079 B2 | 1/2011 | Fukawatase et al. |
| 7,894,951 B2 | 2/2011 | Norris et al. |
| 7,909,361 B2 | 3/2011 | Oblizajek et al. |
| 8,002,075 B2 | 8/2011 | Markfort |
| 8,027,767 B2 | 9/2011 | Klein et al. |
| 8,055,409 B2 | 11/2011 | Tsuchiya |
| 8,069,745 B2 | 12/2011 | Strieter et al. |
| 8,079,312 B2 | 12/2011 | Long |
| 8,146,945 B2 | 4/2012 | Born et al. |
| 8,170,725 B2 | 5/2012 | Chin et al. |
| 8,260,482 B1 | 9/2012 | Szybalski et al. |
| 8,352,110 B1 | 1/2013 | Szybalski et al. |
| 8,479,605 B2 | 7/2013 | Shavrnoch et al. |
| 8,548,667 B2 | 10/2013 | Kaufmann |
| 8,606,455 B2 | 12/2013 | Boehringer et al. |
| 8,634,980 B1 | 1/2014 | Urmson et al. |
| 8,650,982 B2 | 2/2014 | Matsuno et al. |
| 8,670,891 B1 | 3/2014 | Szybalski et al. |
| 8,695,750 B1 | 4/2014 | Hammond et al. |
| 8,818,608 B2 | 8/2014 | Cullinane et al. |
| 8,825,258 B2 | 9/2014 | Cullinane et al. |
| 8,825,261 B1 | 9/2014 | Szybalski et al. |
| 8,843,268 B2 | 9/2014 | Lathrop et al. |
| 8,874,301 B1 | 10/2014 | Rao et al. |
| 8,880,287 B2 | 11/2014 | Lee et al. |
| 8,881,861 B2 | 11/2014 | Tojo |
| 8,899,623 B2 | 12/2014 | Stadler et al. |
| 8,909,428 B1 | 12/2014 | Lombrozo |
| 8,948,993 B2 | 2/2015 | Schulman et al. |
| 8,950,543 B2 | 2/2015 | Heo et al. |
| 8,994,521 B2 | 3/2015 | Gazit |
| 9,002,563 B2 | 4/2015 | Green et al. |
| 9,031,729 B2 | 5/2015 | Lathrop et al. |
| 9,032,835 B2 | 5/2015 | Davies et al. |
| 9,045,078 B2 | 6/2015 | Tovar et al. |
| 9,073,574 B2 | 7/2015 | Cuddihy et al. |
| 9,092,093 B2 | 7/2015 | Jubner et al. |
| 9,108,584 B2 | 8/2015 | Rao et al. |
| 9,134,729 B1 | 9/2015 | Szybalski et al. |
| 9,150,200 B2 | 10/2015 | Urhahne |
| 9,150,224 B2 | 10/2015 | Yopp |
| 9,164,619 B2 | 10/2015 | Goodlein |
| 9,174,642 B2 | 11/2015 | Wimmer et al. |
| 9,186,994 B2 | 11/2015 | Okuyama et al. |
| 9,193,375 B2 | 11/2015 | Schramm et al. |
| 9,199,553 B2 | 12/2015 | Cuddihy et al. |
| 9,227,531 B2 | 1/2016 | Cuddihy et al. |
| 9,233,638 B2 | 1/2016 | Lisseman et al. |
| 9,235,111 B2 | 1/2016 | Davidsson et al. |
| 9,235,211 B2 | 1/2016 | Davidsson et al. |
| 9,235,987 B2 | 1/2016 | Green et al. |
| 9,238,409 B2 | 1/2016 | Lathrop et al. |
| 9,248,743 B2 | 2/2016 | Enthaler et al. |
| 9,260,130 B2 | 2/2016 | Mizuno |
| 9,290,174 B1 | 3/2016 | Zagorski |
| 9,290,201 B1 | 3/2016 | Lombrozo |
| 9,298,184 B2 | 3/2016 | Bartels et al. |
| 9,308,857 B2 | 4/2016 | Lisseman et al. |
| 9,308,891 B2 | 4/2016 | Cudak et al. |
| 9,333,983 B2 | 5/2016 | Lathrop et al. |
| 9,352,752 B2 | 5/2016 | Cullinane et al. |
| 9,360,865 B2 | 6/2016 | Yopp |
| 9,630,644 B2 * | 4/2017 | Soderlind .............. B62D 1/181 |
| 9,852,752 B1 | 12/2017 | Chou et al. |
| 9,919,724 B2 * | 3/2018 | Lubischer .............. B62D 1/181 |
| 10,065,655 B2 | 9/2018 | Bendewald et al. |
| 10,144,383 B2 * | 12/2018 | Bodtker ................. B60K 35/00 |
| 2003/0046012 A1 | 3/2003 | Yamaguchi |
| 2003/0094330 A1 | 5/2003 | Boloorchi et al. |
| 2003/0227159 A1 | 12/2003 | Muller |
| 2004/0016588 A1 | 1/2004 | Vitale et al. |
| 2004/0046346 A1 | 3/2004 | Eki et al. |
| 2004/0099468 A1 | 5/2004 | Chernoff et al. |
| 2004/0129098 A1 | 7/2004 | Gayer et al. |
| 2004/0204808 A1 | 10/2004 | Satoh et al. |
| 2004/0262063 A1 | 12/2004 | Kaufmann et al. |
| 2005/0001445 A1 | 1/2005 | Ercolano |
| 2005/0081675 A1 | 4/2005 | Oshita et al. |
| 2005/0197746 A1 | 9/2005 | Pelchen et al. |
| 2005/0275205 A1 | 12/2005 | Ahnafield |
| 2006/0224287 A1 | 10/2006 | Izawa et al. |
| 2006/0244251 A1 | 11/2006 | Muller |

(56) References Cited

U.S. PATENT DOCUMENTS

| | | |
|---|---|---|
| 2007/0021889 A1 | 1/2007 | Tsuchiya |
| 2007/0029771 A1 | 2/2007 | Haglund et al. |
| 2007/0046003 A1 | 3/2007 | Mori et al. |
| 2007/0046013 A1 | 3/2007 | Bito |
| 2007/0241548 A1 | 10/2007 | Fong |
| 2007/0284867 A1 | 12/2007 | Cymbal et al. |
| 2008/0009986 A1 | 1/2008 | Lu et al. |
| 2008/0028884 A1 | 2/2008 | Monash |
| 2008/0217901 A1 | 9/2008 | Olgren et al. |
| 2008/0238068 A1 | 10/2008 | Kumar et al. |
| 2009/0024278 A1 | 1/2009 | Kondo et al. |
| 2009/0107284 A1 | 4/2009 | Lucas et al. |
| 2009/0256342 A1 | 10/2009 | Cymbal et al. |
| 2009/0276111 A1 | 11/2009 | Wang et al. |
| 2009/0292466 A1 | 11/2009 | McCarthy et al. |
| 2010/0152952 A1 | 6/2010 | Lee et al. |
| 2010/0222976 A1 | 9/2010 | Haug |
| 2010/0228417 A1 | 9/2010 | Lee et al. |
| 2010/0228438 A1 | 9/2010 | Buerkle |
| 2010/0280713 A1 | 11/2010 | Stahlin et al. |
| 2010/0286869 A1 | 11/2010 | Katch et al. |
| 2010/0288567 A1 | 11/2010 | Bonne |
| 2011/0098922 A1 | 4/2011 | Ibrahim |
| 2011/0153160 A1 | 6/2011 | Hesseling et al. |
| 2011/0167940 A1 | 7/2011 | Shavrnoch et al. |
| 2011/0187518 A1 | 8/2011 | Strumolo et al. |
| 2011/0266396 A1 | 11/2011 | Abildgaard et al. |
| 2011/0282550 A1 | 11/2011 | Tada et al. |
| 2012/0136540 A1 | 5/2012 | Miller |
| 2012/0205183 A1 | 8/2012 | Rombold |
| 2012/0209473 A1 | 8/2012 | Birsching et al. |
| 2012/0215377 A1 | 8/2012 | Takemura et al. |
| 2013/0002416 A1 | 1/2013 | Gazit |
| 2013/0087006 A1 | 4/2013 | Ohtsubo et al. |
| 2013/0158771 A1 | 6/2013 | Kaufmann |
| 2013/0218396 A1 | 8/2013 | Moshchuk et al. |
| 2013/0233117 A1 | 9/2013 | Read et al. |
| 2013/0292955 A1 | 11/2013 | Higgins et al. |
| 2013/0325202 A1 | 12/2013 | Howard et al. |
| 2014/0028008 A1 | 1/2014 | Stadler et al. |
| 2014/0046542 A1 | 2/2014 | Kauffman et al. |
| 2014/0046547 A1 | 2/2014 | Kauffman et al. |
| 2014/0111324 A1 | 4/2014 | Lisseman et al. |
| 2014/0277896 A1 | 9/2014 | Lathrop et al. |
| 2014/0300479 A1 | 10/2014 | Wolter et al. |
| 2014/0309816 A1 | 10/2014 | Stefan et al. |
| 2015/0002404 A1 | 1/2015 | Hooton |
| 2015/0014086 A1 | 1/2015 | Eisenbarth |
| 2015/0032322 A1 | 1/2015 | Wimmer |
| 2015/0051780 A1 | 2/2015 | Hahne |
| 2015/0060185 A1 | 3/2015 | Feguri |
| 2015/0120142 A1 | 4/2015 | Park et al. |
| 2015/0210273 A1 | 7/2015 | Kaufmann et al. |
| 2015/0246673 A1 | 9/2015 | Tseng et al. |
| 2015/0251666 A1 | 9/2015 | Attard et al. |
| 2015/0283998 A1 | 10/2015 | Lind et al. |
| 2015/0324111 A1 | 11/2015 | Jubner et al. |
| 2015/0375769 A1 | 12/2015 | Abboud et al. |
| 2016/0009332 A1 | 1/2016 | Sirbu |
| 2016/0075371 A1 | 3/2016 | Varunkikar et al. |
| 2016/0082867 A1 | 3/2016 | Sugioka et al. |
| 2016/0185387 A1 | 6/2016 | Kuoch |
| 2016/0200246 A1 | 7/2016 | Lisseman et al. |
| 2016/0200343 A1 | 7/2016 | Lisseman et al. |
| 2016/0200344 A1 | 7/2016 | Sugioka et al. |
| 2016/0207538 A1 | 7/2016 | Urano et al. |
| 2016/0209841 A1 | 7/2016 | Yamaoka et al. |
| 2016/0229450 A1 | 8/2016 | Basting et al. |
| 2016/0231743 A1 | 8/2016 | Bendewald et al. |
| 2016/0244070 A1 | 8/2016 | Bendewald et al. |
| 2016/0318540 A1 | 11/2016 | King |
| 2016/0318542 A1 | 11/2016 | Pattok et al. |
| 2016/0347347 A1 | 12/2016 | Lubischer |
| 2016/0347348 A1 | 12/2016 | Lubischer |
| 2016/0362084 A1 | 12/2016 | Martin et al. |
| 2016/0362117 A1 | 12/2016 | Kaufmann et al. |
| 2016/0362126 A1 | 12/2016 | Lubischer |
| 2016/0368522 A1 | 12/2016 | Lubischer et al. |
| 2016/0375860 A1 | 12/2016 | Lubischer |
| 2016/0375923 A1 | 12/2016 | Schulz et al. |
| 2016/0375925 A1 | 12/2016 | Lubischer et al. |
| 2016/0375926 A1 | 12/2016 | Lubischer et al. |
| 2016/0375927 A1 | 12/2016 | Schulz et al. |
| 2016/0375928 A1 | 12/2016 | Magnus |
| 2016/0375929 A1 | 12/2016 | Rouleau |
| 2016/0375931 A1 | 12/2016 | Lubischer |
| 2017/0029009 A1 | 2/2017 | Rouleau |
| 2017/0029018 A1 | 2/2017 | Lubischer |
| 2017/0113712 A1 | 4/2017 | Watz |
| 2017/0341677 A1 | 11/2017 | Buzzard et al. |
| 2017/0361863 A1* | 12/2017 | Rouleau ............... B62D 1/185 |
| 2018/0050720 A1* | 2/2018 | King .................... B62D 1/184 |
| 2018/0072339 A1 | 3/2018 | Bodtker |
| 2018/0086378 A1* | 3/2018 | Bell ..................... B62D 1/181 |
| 2018/0148084 A1 | 5/2018 | Nash et al. |
| 2018/0251147 A1* | 9/2018 | Heitz ................... B62D 1/181 |
| 2018/0319419 A1* | 11/2018 | Kreutz ................. B62D 1/181 |
| 2018/0370559 A1* | 12/2018 | Swamidason ........ B62D 1/185 |
| 2019/0016365 A1* | 1/2019 | Swamidason ........ B62D 1/183 |

FOREIGN PATENT DOCUMENTS

| | | |
|---|---|---|
| CN | 101037117 A | 9/2007 |
| CN | 101041355 A | 9/2007 |
| CN | 101596903 A | 12/2009 |
| CN | 102452391 A | 5/2012 |
| CN | 103419840 A2 | 12/2013 |
| CN | 103448785 A | 12/2013 |
| DE | 19523214 A1 | 1/1997 |
| DE | 19923012 A1 | 11/2000 |
| DE | 10212782 A1 | 10/2003 |
| DE | 102005032528 A1 | 1/2007 |
| DE | 102005056438 A1 | 6/2007 |
| DE | 102006025254 A1 | 12/2007 |
| DE | 102010025197 A1 | 12/2011 |
| DE | 102015216326 B4 | 9/2016 |
| EP | 1559630 A2 | 8/2005 |
| EP | 1783719 A2 | 5/2007 |
| EP | 1932745 A2 | 6/2008 |
| EP | 2384946 A2 | 11/2011 |
| EP | 2426030 A1 | 3/2012 |
| EP | 2489577 A2 | 8/2012 |
| EP | 2604487 A1 | 6/2013 |
| EP | 1606149 B1 | 5/2014 |
| FR | 2862595 A1 | 5/2005 |
| FR | 3016327 A1 | 7/2015 |
| JP | 60164629 A | 8/1985 |
| JP | S60157963 A | 8/1985 |
| JP | H05162652 A | 6/1993 |
| JP | 2007253809 A | 10/2007 |
| KR | 20100063433 A | 6/2010 |
| WO | 2006099483 A1 | 9/2006 |
| WO | 2010082394 A1 | 7/2010 |
| WO | 2010116518 A1 | 10/2010 |

OTHER PUBLICATIONS

CN Patent Application No. 201210599006.6 First Office Action dated Jan. 27, 2015, 9 pages.
CN Patent Application No. 201210599006.6 Second Office Action dated Aug. 5, 2015, 5 pages.
CN Patent Application No. 201310178012.9 First Office Action dated Apr. 13, 2015, 13 pages.
CN Patent Application No. 201310178012.9 Second Office Action dated Dec. 28, 2015, 11 pages.
CN Patent Application No. 201410089167 First Office Action and Search Report dated Feb. 3, 2016, 9 pages.
EP Application No. 14156903.8 Extended European Search Report, dated Jan. 27, 2015, 10 pages.
EP Application No. 14156903.8 Office Action dated Nov. 16, 2015, 4 pages.
EP Application No. 14156903.8 Office Action dated May 31, 2016, 5 pages.

(56) References Cited

OTHER PUBLICATIONS

EP Application No. 14156903.8 Partial European Search Report dated Sep. 23, 2014, 6 pages.
European Application No. 12196665.9 Extended European Search Report dated Mar. 6, 2013, 7 pages.
European Search Report for European Application No. 13159950.8; dated Jun. 6, 2013; 7 pages.
European Search Report for related European Application No. 15152834.6, dated Oct. 8, 2015; 7 pages.
Gillespie, Thomas D.; "Fundamentals of Vehicle Dynamics"; Society of Automotive Engineers, Inc.; published 1992; 294 pages.
Kichun, et al.; "Development of Autonomous Car—Part II: A Case Study on the Implementation of an Autonomous Driving System Based on Distributed Architecture"; IEEE Transactions on Industrial Electronics, vol. 62, No. 8, Aug. 2015; 14 pages.
Varunjikar, Tejas; Design of Horizontal Curves With DownGrades Using Low-Order Vehicle Dynamics Models; A Theisis by T. Varunkikar; 2011; 141 pages.
Partial European Search Report for related European Patent Application No. 14156903.8, dated Sep. 23, 2014, 6 pages.
Van Der Jagt, Pim; "Prediction of steering efforts during stationary or slow rolling parking maneuvers"; Jul. 2013, 20 pages.
English translation regarding DE10201521632664, ThyssenKrupp AG; 21 pgs.

\* cited by examiner

ELECTRIC ACTUATOR MECHANISM FOR RETRACTABLE STEERING COLUMN ASSEMBLY WITH MANUAL OVERRIDE

BACKGROUND OF THE INVENTION

The embodiments described herein relate to retracting steering column assemblies and, more particularly, to an electric actuator mechanism for such assemblies.

As autonomously driven vehicles are developed, a number of opportunities will evolve related to comfort, entertainment and functionality for drivers. Steering wheels are commonly limited to standard driving positions due to the need for a driver to handle the steering wheel during operation of the vehicle. These limitations may be unnecessary during an autonomous driving mode of a vehicle. For example, a steering wheel may be retracted to a stowed position to enlarge the space available to a driver. An electromechanical system is often relied upon to translate the steering column between an extended position and a retracted position. Such systems do not allow for a manual override of the electromechanical reliance for translation, thereby leaving the driver without an option for manual return of the steering column to the extended position.

SUMMARY OF THE INVENTION

According to one aspect of the disclosure, an electric actuator mechanism for a retractable steering column assembly includes an electric motor. The mechanism also includes a drive gear driven by the electric motor. The mechanism further includes a driven gear driven by the drive gear, the driven gear and the drive gear moveable relative to each other between an engaged condition and a disengaged condition, the driven gear operatively coupled to a translating assembly for translating a retractable portion of the retractable steering column assembly between an extended position and a retracted position, the retractable portion disposed in the extended position in a standard driving mode and in the retracted position in an autonomous driving mode, the driven gear and the drive gear moved to the disengaged condition upon a force exerted on the retractable portion by a driver in a direction toward the extended position.

According to another aspect of the disclosure, a retractable steering column assembly for an autonomous or semi-autonomous vehicle includes a retractable portion of the assembly translatable between an extended position and a retracted position, the retractable portion disposed in the extended position in a standard driving mode and in the retracted position in an autonomous driving mode. Also included is a nut and threaded rod, the nut operatively coupled to the retractable portion to translate the retractable portion between the extended position and the retracted position. Further included is an electric motor. Yet further included is a drive gear driven by the electric motor. Also included is a driven gear driven by the drive gear, the driven gear and the drive gear moveable relative to each other between an engaged condition and a disengaged condition, the driven gear operatively coupled to the nut to drive the nut along the threaded rod in the engaged condition. Further included is a biasing mechanism biasing the driven gear and the drive gear into the engaged condition, the driven gear and the drive gear moved to the disengaged condition upon a force exerted on the retractable portion by a driver in a direction toward the extended position.

According to yet another aspect of the invention, a retractable steering column assembly for an autonomous or semi-autonomous vehicle includes a retractable portion of the assembly translatable between an extended position and a retracted position, the retractable portion disposed in the extended position in a standard driving mode and in the retracted position in an autonomous driving mode. Also included is an electric actuator mechanism operatively coupled to the retractable portion for transitioning the retractable portion between the extended position and the retracted position, the electric actuator mechanism manually overridden upon a force exerted on the retractable portion by a driver in a direction toward the extended position.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
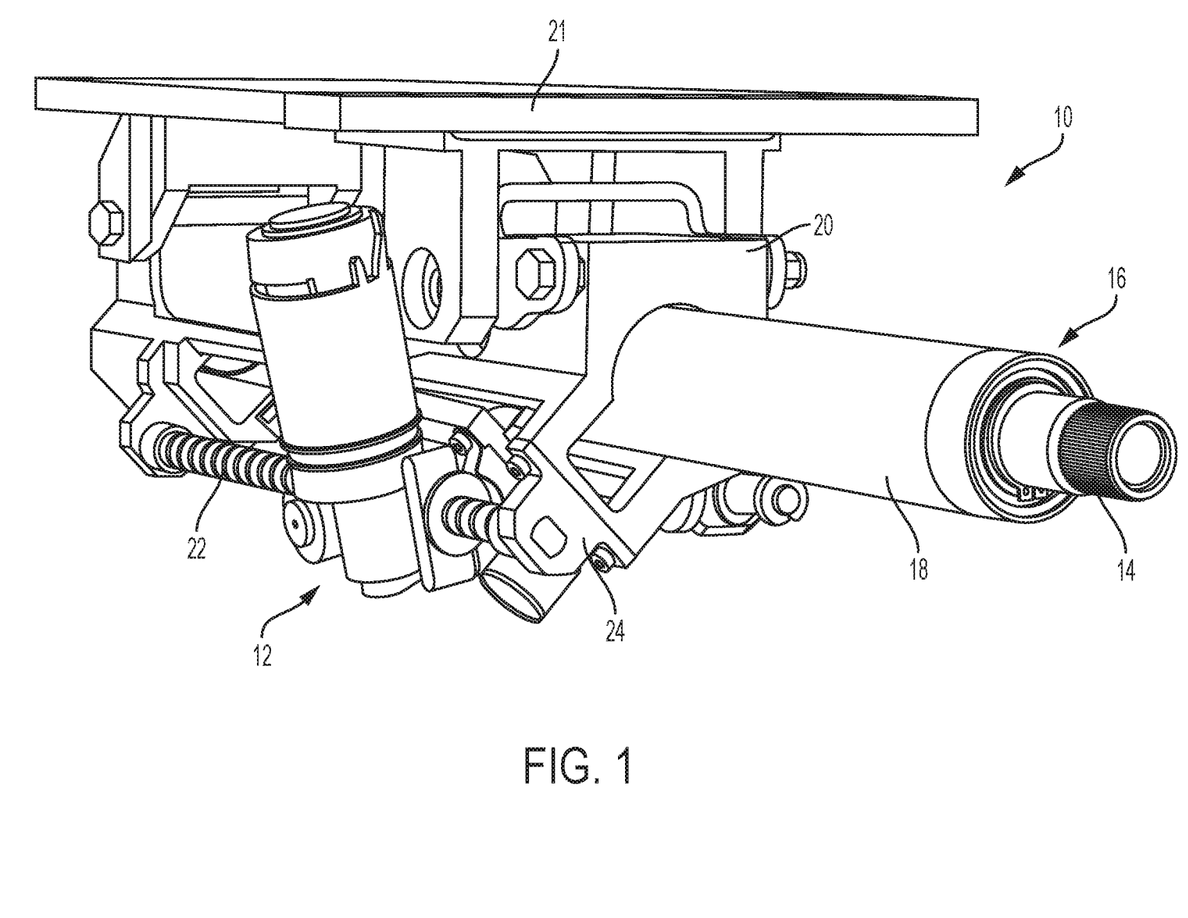
FIG. 1 is a perspective view of a retractable steering column assembly.

Referring now to the Figures, where the invention will be described with reference to specific embodiments, without limiting same, FIG. 1 illustrates a steering column assembly 10. The steering column assembly 10 facilitates translation of a steering wheel (not shown) and a steering shaft 14 in a retractable manner. This is particularly beneficial in embodiments where the assembly 10 is employed in a passenger vehicle equipped with Advanced Driver Assist System(s) (ADAS) to allow the vehicle to be autonomously, or semi-autonomously, controlled using sensing, steering, and/or braking technology. When the ADAS is activated, the steering wheel is not required for vehicle control in some situations. Retraction of the steering wheel and steering shaft 14 toward, and possibly into, the instrument panel greatly enhances user comfort by providing a driver with more space. The additional space provided facilitates additional workspace area or leg room, for example.

The embodiments described herein provide a retractable steering column which allows the steering wheel to be retracted while the vehicle is in an autonomous, or semi-autonomous, driving mode. The operating conditions described herein for the steering wheel are standard driving mode, autonomous driving mode, and a transition mode therebetween.

In the standard driving mode, the steering column assembly 10 is extended to a location that disposes the steering wheel in a position that is comfortably reached by a driver in a manner that allows the driver to fully handle and control the steering wheel. During the standard driving mode, the driver may activate the ADAS through a vehicle interface, such as a switch or button. The transition mode is defined by movement of the steering column assembly 10 during transitioning of the assembly between the standard and autonomous driving modes. An electric actuator mechanism 12 at least partially retracts the steering column assembly 10 into the instrument panel of the vehicle during the transition mode. When the driver wants to transition back to the standard driving mode, the ADAS is deactivated and the electric actuator mechanism 12 extends the steering column assembly 10 to an extended position that allows the driver to easily handle the steering wheel.

Extension and retraction of the steering column assembly 10 refers to translation of a retractable portion 16 of the steering column assembly 10. The retractable portion 16 includes one or more components that are translatable. For example, in addition to the aforementioned steering wheel and the steering shaft 14, a moveable portion 18, which may also be referred to as an upper jacket in some embodiments, is translatable relative to a stationary portion 20, which may be referred to as a lower jacket in some embodiments. Also shown is a mounting bracket 21 that couples the steering column assembly 10 to the vehicle.

The electric actuator mechanism 12 is operatively coupled to the moveable portion 18 and the stationary portion 20 of the steering column assembly 10. In particular, a threaded rod 22, such as a ball screw, is operatively coupled to the stationary portion 20 with one or more brackets 24. A nut 26, such as a ball nut, is in threaded engagement with the threaded rod 22 for translation along the threaded rod 22 (FIG. 3). The threaded rod 22 and nut 26 may be referred to herein as a translating assembly. As described in detail below, a plurality of additional components of the electric actuator mechanism 12 are operatively coupled to the nut 26 and also translate along the threaded rod 22, one such component being at least one column mounting bracket 28 (FIG. 2) that couples the electric actuator mechanism 12 to the moveable portion 18 of the steering column assembly 10. In operation, the electric actuator mechanism 12 translates the moveable portion 18 relative to the stationary portion 20 to extend and retract the steering column assembly 10 in an electrically powered manner.

Figure 2:
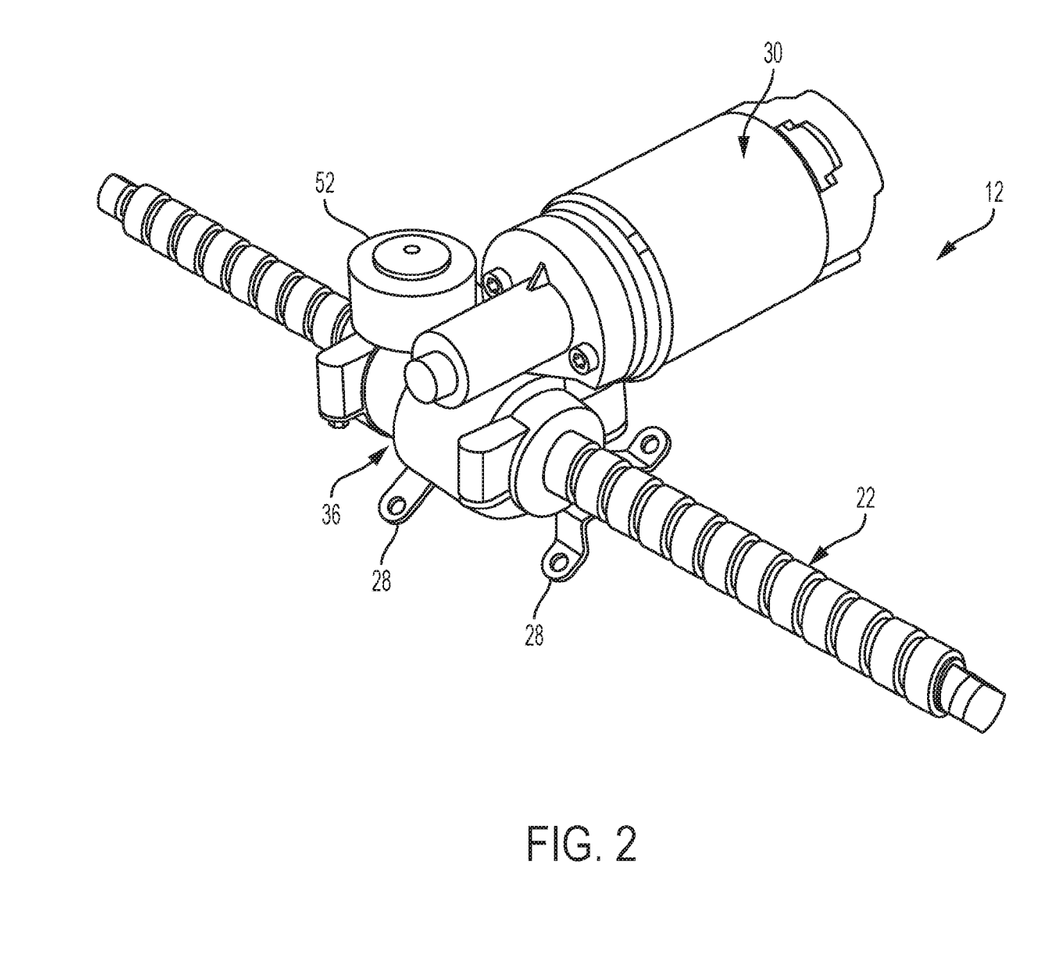
FIG. 2 is a perspective view of an electric actuator mechanism for the retractable steering column assembly.
Figure 3:
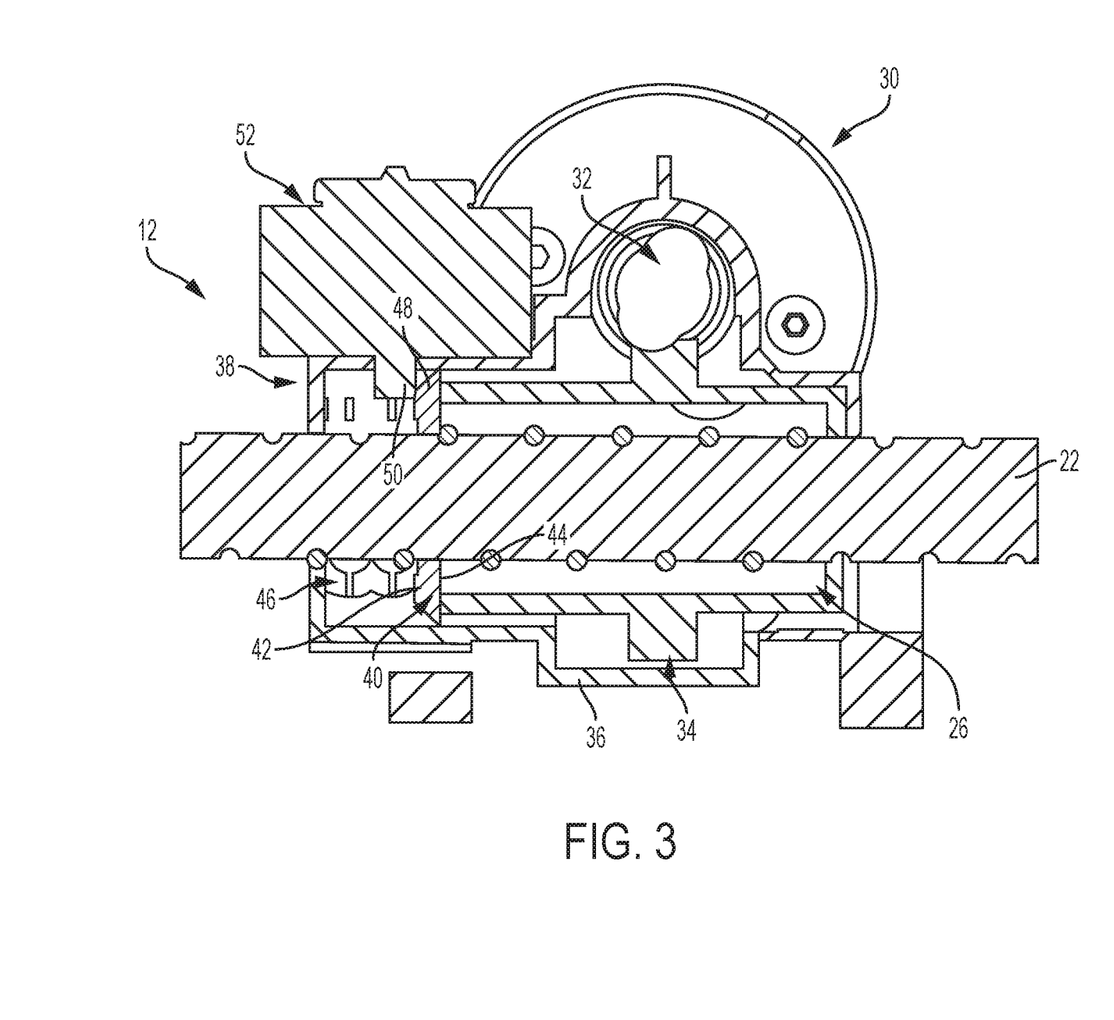
FIG. 3 is a sectional view of the electric actuator mechanism.

Referring to FIGS. 2 and 3, the electric actuator mechanism 12 is illustrated in greater detail. The electric actuator mechanism 12 includes the threaded rod 22 and the nut 26, as described above. The mechanism 12 also includes an electric motor 30 having an output shaft operatively coupled to a gear assembly. The gear assembly includes a drive gear 32 and a driven gear 34 housed within a gearbox 36. The above-described column mounting bracket(s) 28 extend from the gearbox 36 in some embodiments. While numerous types of gear assemblies are contemplated, the illustrated embodiment is a worm gear assembly, with the drive gear 32 being a worm and the driven gear 34 being a worm wheel. The driven gear 34 is fixedly coupled to the nut 26, such that the electric motor 30 drives the drive gear 32, the drive gear 32 drives the driven gear 34, and the driven gear 34 imparts rotation of the nut 26 to translate the nut 26 along the threaded rod 22, thereby translating the retractable portion 16 of the steering column assembly 10.

The drive gear 32 and the driven gear 34 are in meshed engagement in an engaged condition and are moveable out of engagement in a disengaged condition. In the engaged condition, electric actuated translation of the retractable portion 16 is facilitated by the electric motor 30, but movement to the disengaged condition does not allow electric actuation, even during movement of the drive gear 32.

A biasing mechanism 38 is included to maintain the drive gear 32 and the driven gear 34 in the engaged condition. The biasing mechanism 38 includes a washer 40 disposed in abutment with the nut 26 and/or driven gear 34. The washer is connected to the assembly consisting of 34 and 26. The washer 40 has a first surface (or side) 42 and a second surface (or side) 44, with the second surface 44 being the portion of the washer 40 that is in contact with the nut 26 and/or the driven gear 34. A biasing component, such as a spring 46 that is shown in the illustrated embodiment, is in contact with the first surface 42 of the washer 40 to bias the washer 40 against the nut 26 and/or driven gear 34 to maintain the engaged condition between the drive gear 32 and the driven gear 34.

The washer 40 includes an outer diameter that is formed with an inclined surface 48 that extends between the first surface 42 and the second surface 44 of the washer 40. Specifically, the inclined surface 48 causes the outer diameter of the washer 40 to increase in a direction from the first surface 42 to the second surface 44. The inclined surface 48 provides a ramp for a pin 50, or a similar component, to slide along, as will be described in detail below. The pin 50 is translatable, such that the pin 50 is extendable and retractable between a plurality of positions. Translation of the pin 50 is actuated by a pin actuating device 52 that is mounted to the gearbox 36. The pin actuating device 52 is a solenoid in some embodiments and a motor in other embodiments. Suitable alternatives may be employed as well.

The pin 50 is translatable between three discrete, and fixed, positions in some embodiments. In particular, the pin 50 is moveable between a first position, a second position and a third position. The first position disposes the pin 50 at an extended length that places the pin 50 in position to contact the first surface 42 of the washer 40. The second position disposes the pin 50 at an extended length that places the pin 50 in position to contact the inclined surface 48 of the washer 40. The third position disposes the pin 50 at an extended length that provides a clearance between the pin 50 and an outermost diameter of the washer 40 (e.g., intersection of inclined surface 48 and second surface 44).

Figure 4:
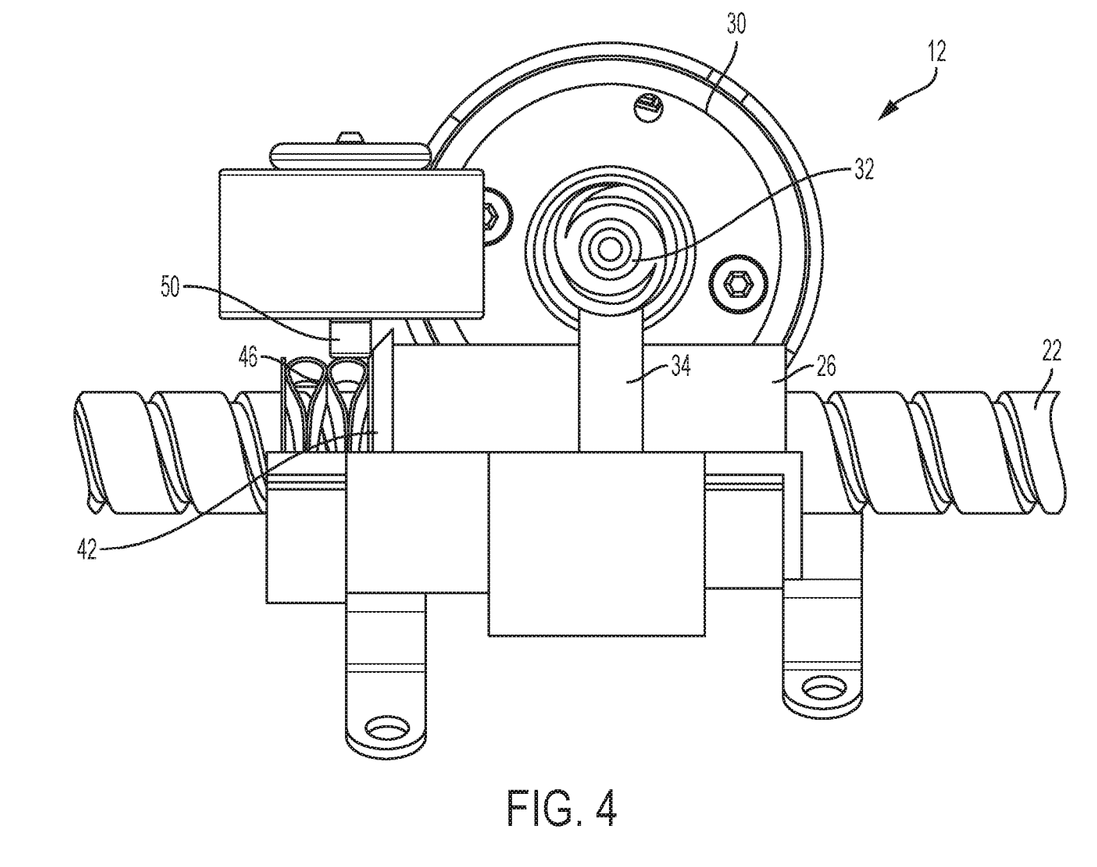
FIG. 4 is an elevational view of the electric actuator mechanism in a first condition.

Referring to FIGS. 4-9, illustrated is a sequence of operating conditions of the steering column assembly 10 and, more particularly, the electric actuator mechanism 12. FIG. 4 illustrates the pin 50 in the first position to place the pin 50 in contact with, or in close proximity to, the first surface 42 of the washer 40. In this position the spring 46 biases the washer 40 against the nut 26 and/or the driven gear 34 to maintain the engaged condition of the gears 32, 34. In this position, the nut 26 may be driven along the threaded rod 22 by the electric motor 30.

Figure 5:
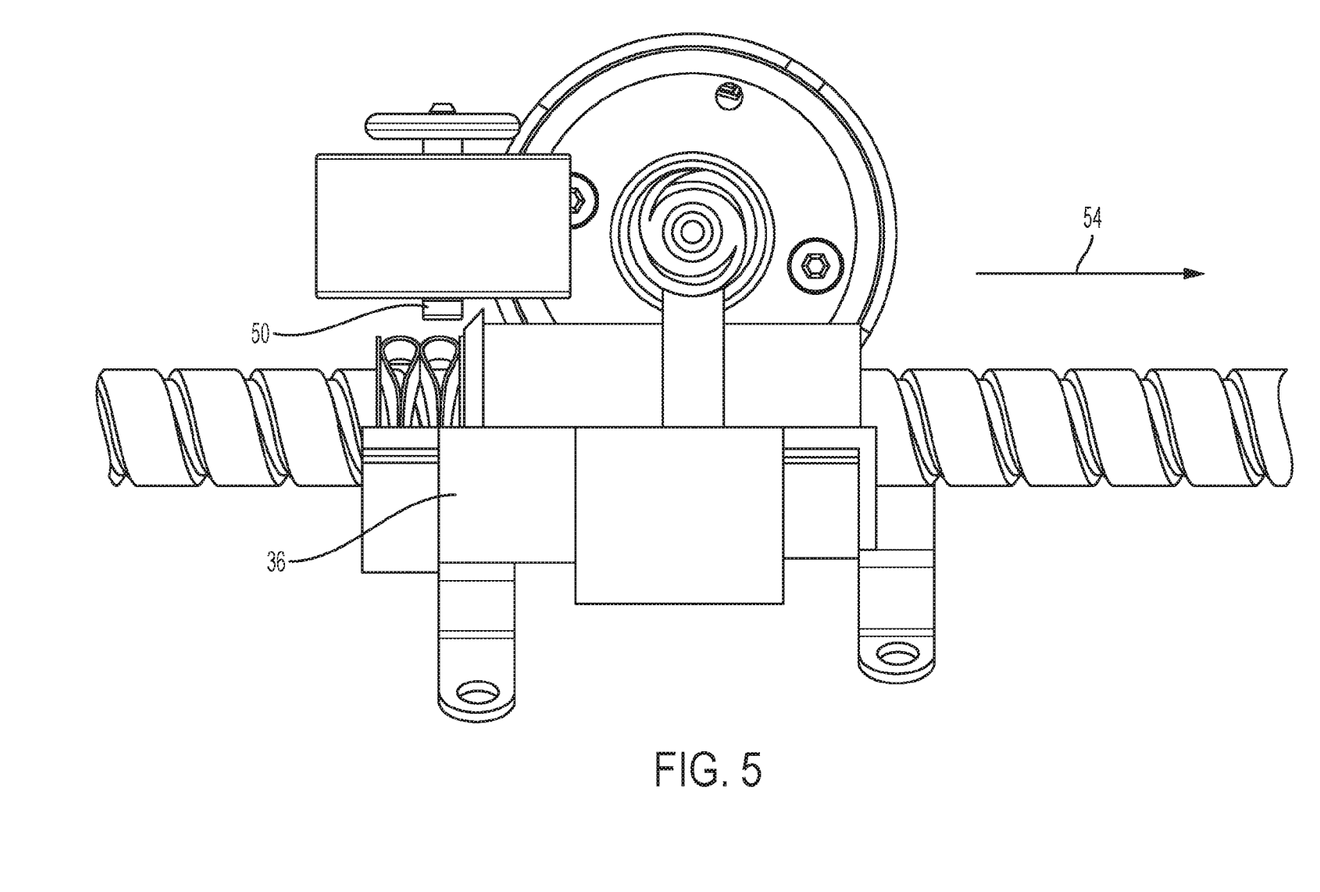
FIG. 5 is an elevational view of the electric actuator mechanism in a second condition.

As shown in FIG. 5, the driver may initiate a retraction (stow) command to transition from the standard driving mode (FIG. 4) and the retractable portion 16 translates during the transition mode. In this condition, the pin 50 is retracted to the second position. If the driver decides to override the stow command, a manual force is exerted on the retractable portion 16 by the driver, such as the steering wheel, to pull the retractable portion 16 toward the extended position. Because the pin 50 is in the second position, a force exerted on the retractable portion 16 toward the extended position imparts a force on the gearbox 36 in the same direction 54.

Figure 6:
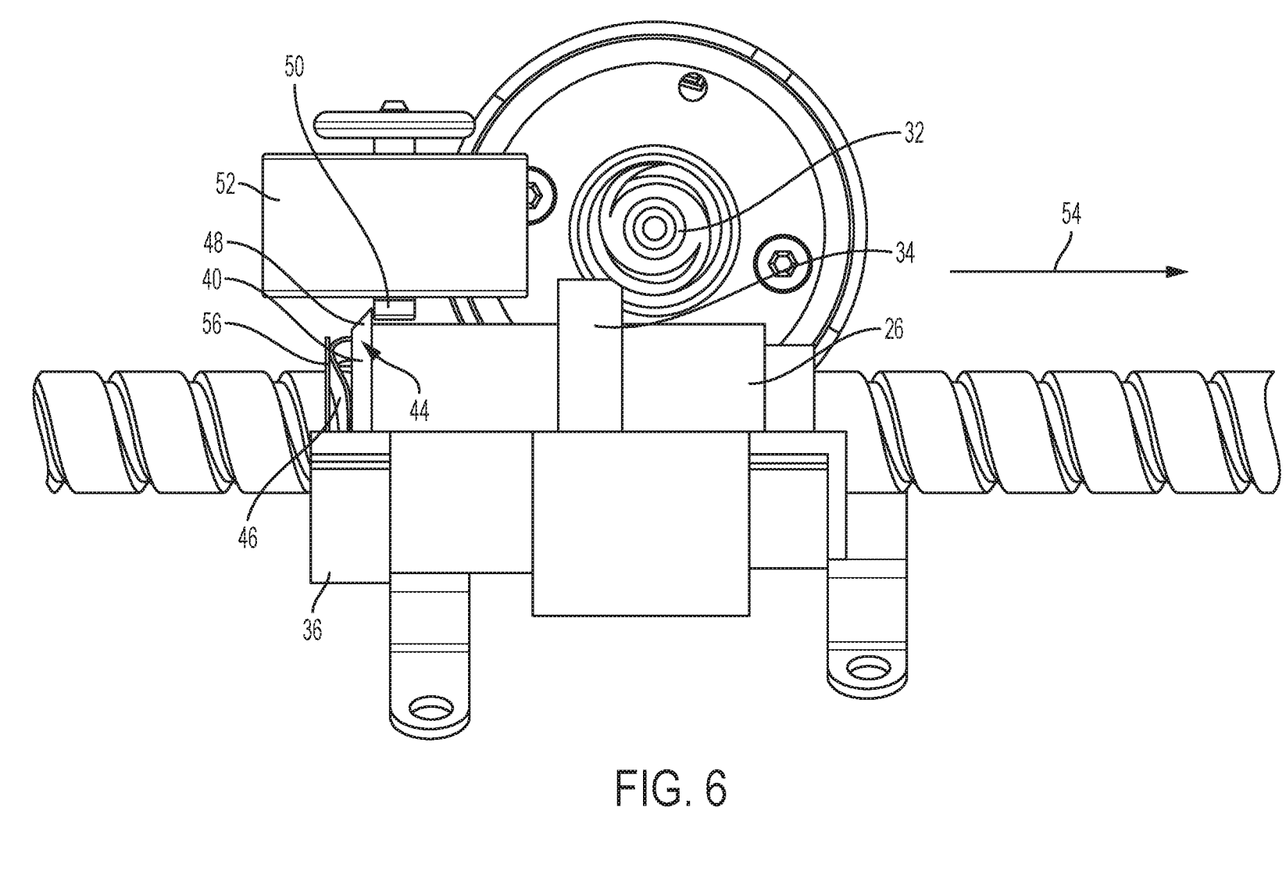
FIG. 6 is an elevational view of the electric actuator mechanism in a third condition.

As shown in FIG. 6, this force pulls the gearbox 36 and the pin actuating device 52 that is mounted to the gearbox 36 in direction 54, with gearbox wall 56 compressing the spring 46 disposed within the gearbox 36. During movement of the pin actuating device 52 relative to the washer 40 and nut 26 and due to the pin 50 being in the second extended position, the pin 50 slides along the inclined surface 48 of the washer 40 until the pin 50 is in engagement with the second surface 44 of the washer. Engagement of the pin 50 with the second surface 44 disengages the driven gear 34 from the drive gear 32 to place the gear assembly in the disengaged condition. With the gears in the disengaged condition, the driver is able to pull the retractable portion 16 back to the extended position by back-driving the nut-screw interface to obtain the standard driving mode.

Figure 7:
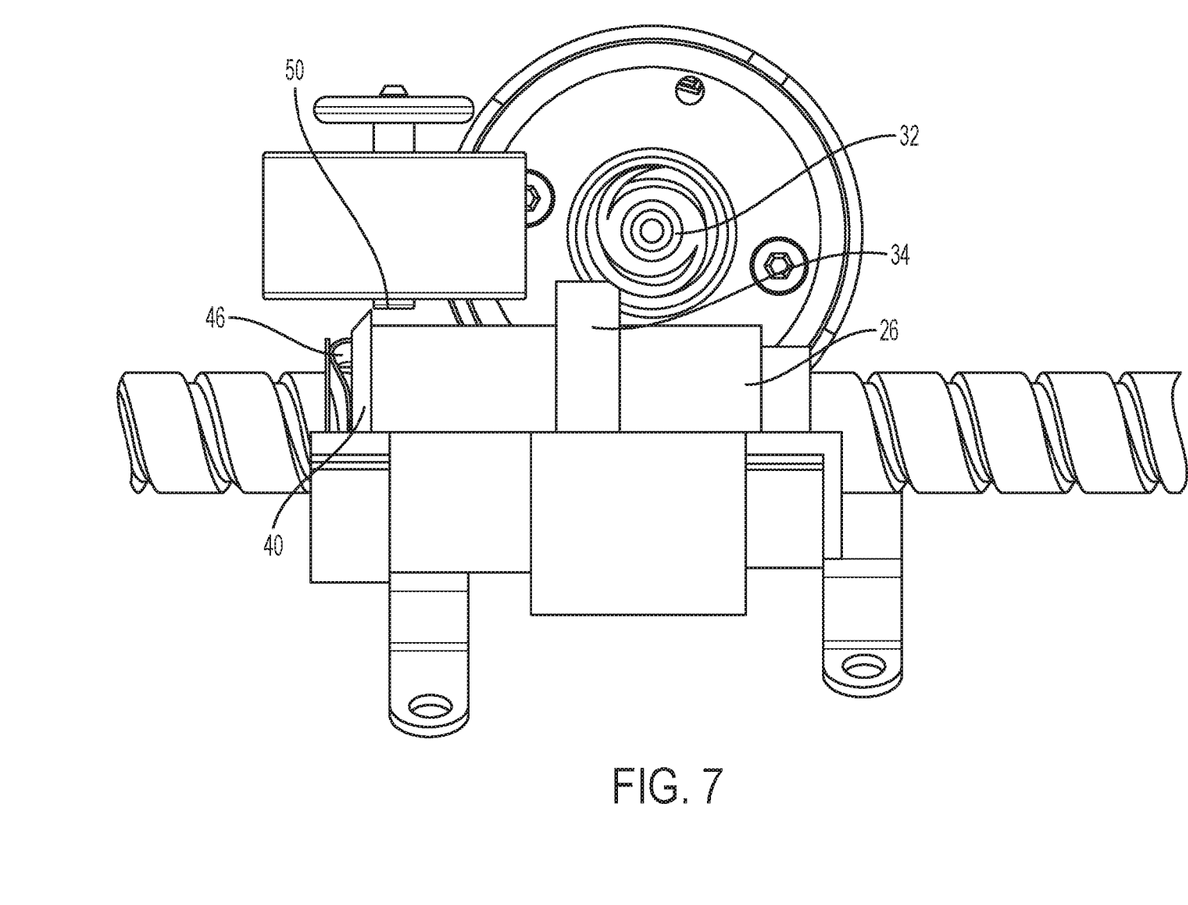
FIG. 7 is an elevational view of the electric actuator mechanism in a fourth condition.
Figure 8:
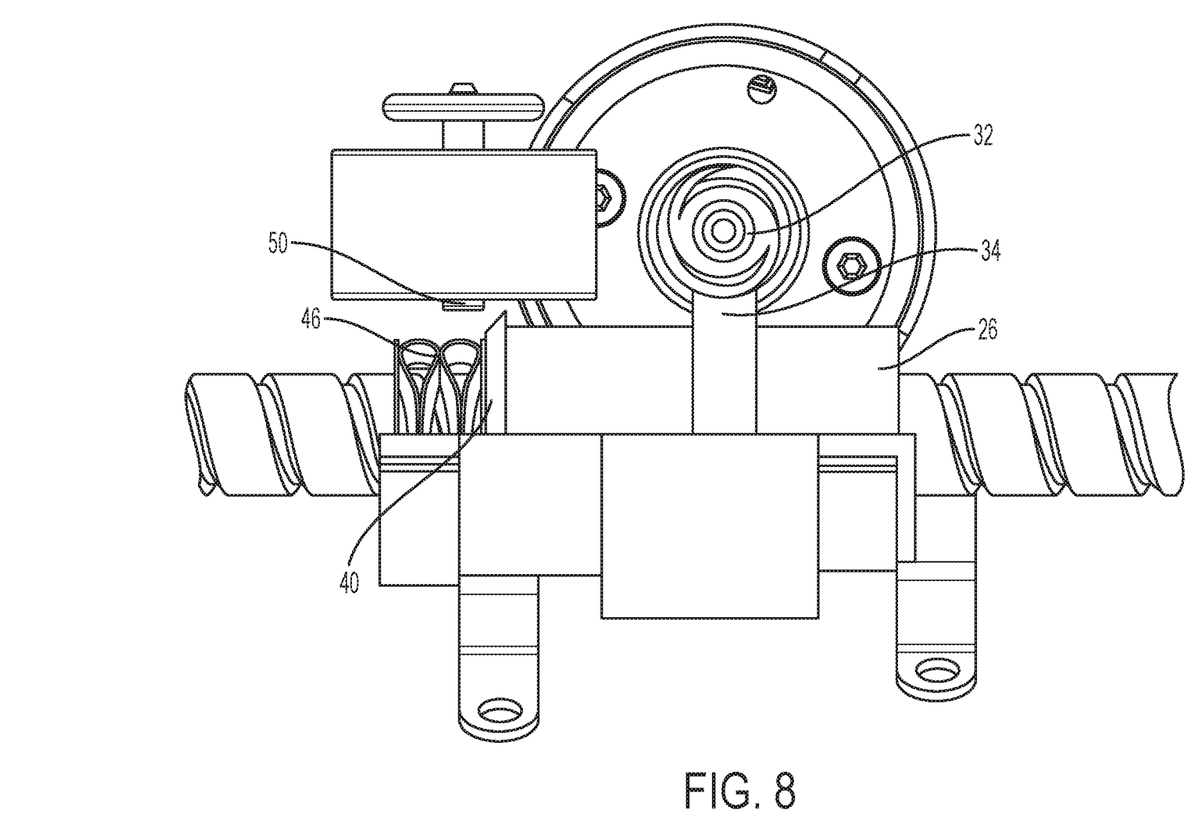
FIG. 8 is an elevational view of the electric actuator mechanism in a fifth condition.
Figure 9:
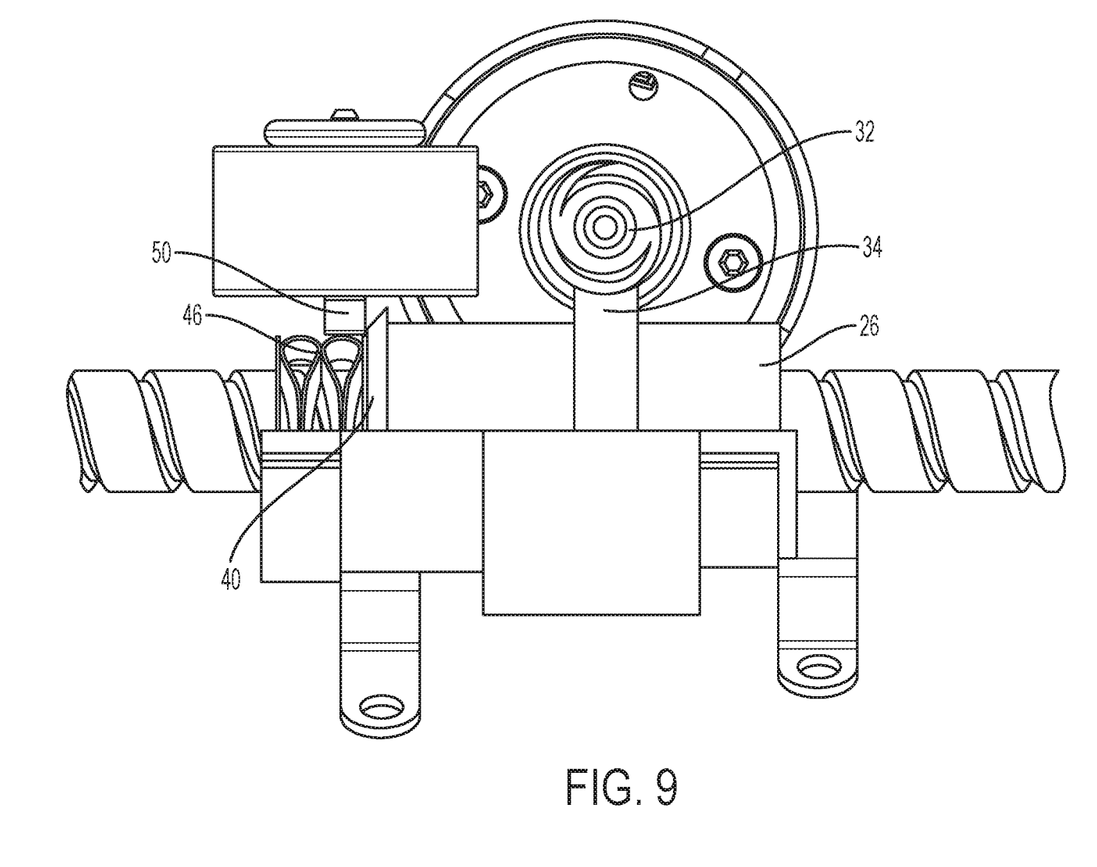
FIG. 9 is an elevational view of the electric actuator mechanism in a sixth condition.

Referring to FIGS. 7 and 8, once the extended position of the retractable portion 16 is reached, the pin 50 is translated to the third position to provide clearance between the pin 50 and the washer 40, thereby allowing the spring force of the spring 46 to bias the nut 26 to reestablish the engaged condition of the drive gear 32 and the driven gear 34. The pin 50 is then returned to the first position for normal operation that allows the retractable portion 16 to be electrically translated with the electric actuator mechanism 12 (FIG. 9).

The embodiments described herein allow a driver to enjoy the benefits of electric actuation of the steering column assembly 10 into and out of an ADAS-controlled driving mode, while providing the ability to manually override the electrically actuated translation, as desired. The manual override may be used to halt translation of the steering column assembly 10 during the transition mode or to manually retract the retractable portion from a fully stowed condition.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An electric actuator mechanism for a retractable steering column assembly comprising:
   an electric motor;
   a drive gear driven by the electric motor; and
   a driven gear driven by the drive gear, the driven gear and the drive gear moveable relative to each other between an engaged condition and a disengaged condition, the driven gear operatively coupled to a translating assembly for translating a retractable portion of the retractable steering column assembly between an extended position and a retracted position, the retractable portion disposed in the extended position in a standard driving mode and in the retracted position in an autonomous driving mode, the driven gear and the drive gear configured to be moved to the disengaged condition upon exertion of a force on the retractable portion by a driver in a direction toward the extended position.

2. The electric actuator mechanism of claim 1, wherein the translating assembly comprises a nut and threaded rod, the nut in meshed engagement with the driven gear and driven along the threaded rod by the driven gear.

3. The electric actuator mechanism of claim 2, further comprising a biasing mechanism biasing the driven gear and the drive gear into the engaged condition.

4. The electric actuator mechanism of claim 3, wherein the biasing mechanism comprises:
   a washer having a first surface and a second surface, the second surface in contact with at least one of the nut and the driven gear; and
   a spring in contact with the first surface of the washer and biasing the washer to maintain the engaged condition of the drive gear and the driven gear.

5. The electric actuator mechanism of claim 4, wherein the washer includes an inclined surface along an outer diameter of the washer between the first surface and the second surface of the washer, the biasing mechanism further comprising a pin disposed proximate the outer diameter of the washer, the pin configured to be in sliding engagement with the inclined surface upon exertion of a force on the retractable portion by a driver in a direction toward the extended position to dispose the pin in contact with the second surface of the washer to lock the driven gear and the drive gear in the disengaged condition.

6. The electric actuator mechanism of claim 5, wherein the pin is translatable between a first position, a second position, and a third position, the first position disposing the pin in contact with the first surface of the washer, the second position disposing the pin in a location engageable with the inclined surface, and the third position providing a clearance between the pin and the outer diameter of the washer.

7. The electric actuator mechanism of claim 5, wherein translation of the pin is actuated by a solenoid.

8. The electric actuator mechanism of claim 5, wherein translation of the pin is actuated by a motor.

9. A retractable steering column assembly for an autonomous or semi-autonomous vehicle comprising:
   a retractable portion of the assembly translatable between an extended position and a retracted position, the retractable portion disposed in the extended position in a standard driving mode and in the retracted position in an autonomous driving mode;
   a nut and threaded rod, the nut operatively coupled to the retractable portion to translate the retractable portion between the extended position and the retracted position;
   an electric motor;
   a drive gear driven by the electric motor;
   a driven gear driven by the drive gear, the driven gear and the drive gear moveable relative to each other between an engaged condition and a disengaged condition, the driven gear operatively coupled to the nut to drive the nut along the threaded rod in the engaged condition;
   a biasing mechanism biasing the driven gear and the drive gear into the engaged condition, the driven gear and the drive gear configured to be moved to the disengaged condition upon a force exerted on the retractable portion by a driver in a direction toward the extended position.

10. The retractable steering column assembly of claim 9, wherein the biasing mechanism comprises:
    a washer having a first surface and a second surface, the second surface in contact with the nut; and a spring in contact with the first surface of the washer and biasing the washer to maintain the engaged condition of the drive gear and the driven gear.

11. The retractable steering column assembly of claim 10, wherein the washer includes an inclined surface along an outer diameter of the washer between the first surface and the second surface of the washer, the biasing mechanism further comprising a pin disposed proximate the outer diameter of the washer, the pin configured to be in sliding engagement with the inclined surface upon exertion of a force on the retractable portion by a driver in a direction toward the extended position to dispose the pin in contact with the second surface of the washer to lock the driven gear and the drive gear in the disengaged condition.

12. The retractable steering column assembly of claim 11, wherein the pin is translatable between a first position, a second position, and a third position, the first position disposing the pin in contact with the first surface of the washer, the second position disposing the pin in a location engageable with the inclined surface, and the third position providing a clearance between the pin and the outer diameter of the washer.

13. The retractable steering column assembly of claim 11, wherein translation of the pin is actuated by a solenoid.

14. The retractable steering column assembly of claim 11, wherein translation of the pin is actuated by a motor.

15. A retractable steering column assembly for an autonomous or semi-autonomous vehicle comprising:
- a retractable portion of the assembly translatable between an extended position and a retracted position, the retractable portion disposed in the extended position in a standard driving mode and in the retracted position in an autonomous driving mode; and
- an electric actuator mechanism operatively coupled to the retractable portion for transitioning the retractable portion between the extended position and the retracted position, the electric actuator mechanism configured to be manually overridden upon a force exerted on the retractable portion by a driver in a direction toward the extended position, the electric actuator mechanism manually overridden while the retractable portion is in the retracted position.

\* \* \* \* \*